Y. FERRER.
COALING APPARATUS.
APPLICATION FILED AUG. 11, 1909.
990,969.
Patented May 2, 1911.
2 SHEETS—SHEET 1.
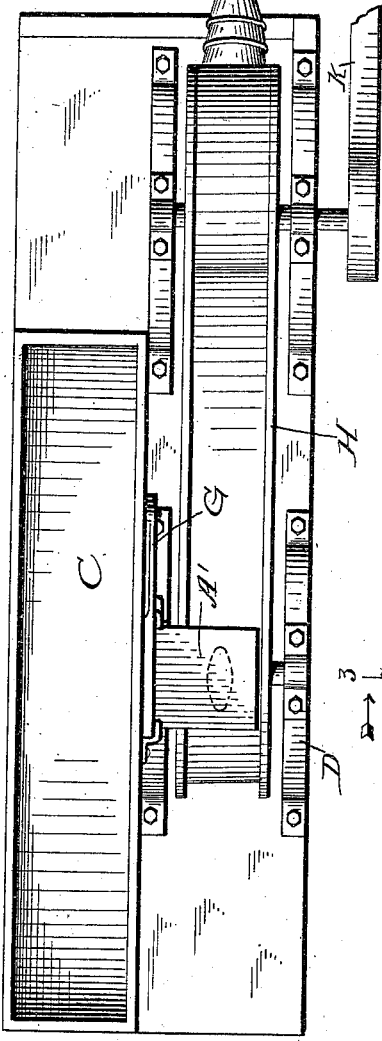
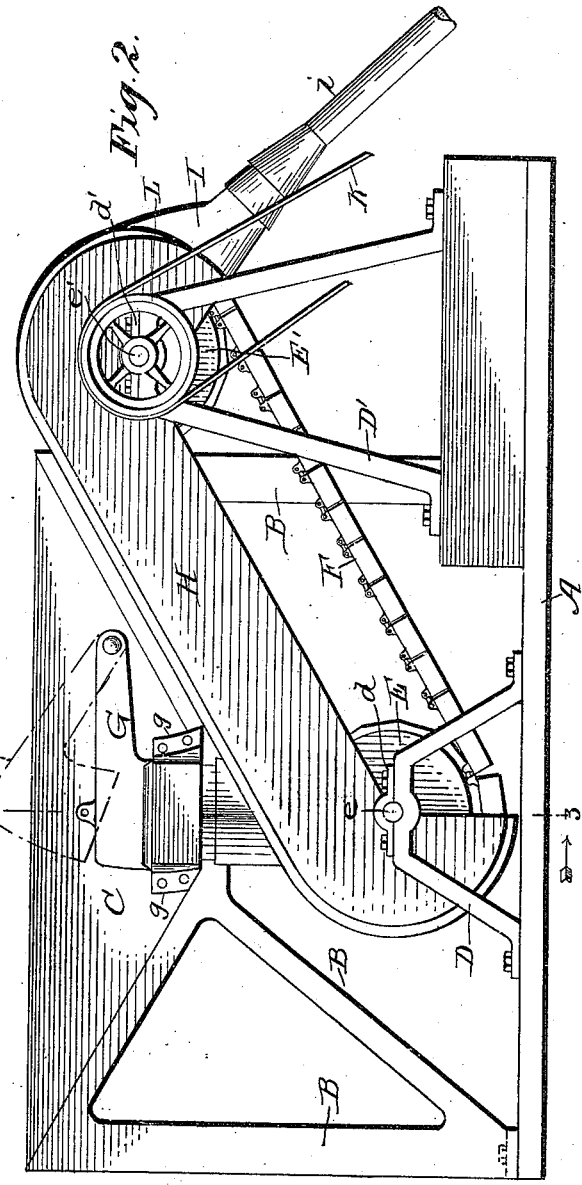
Witnesses:
Inventor:
Ysidoro Ferrer Y. FERRER.
COALING APPARATUS.
APPLICATION FILED AUG. 11, 1909.
990,969.
Patented May 2, 1911.
2 SHEETS—SHEET 2.
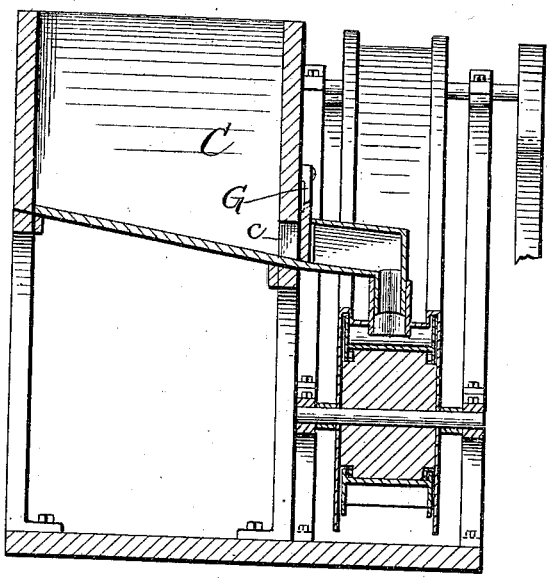
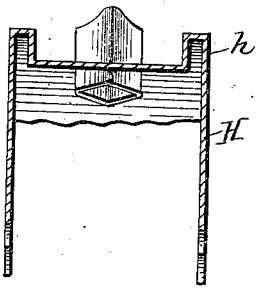
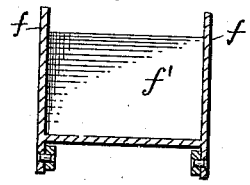
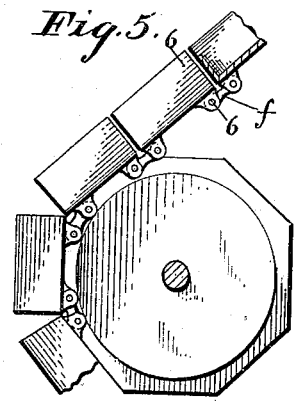
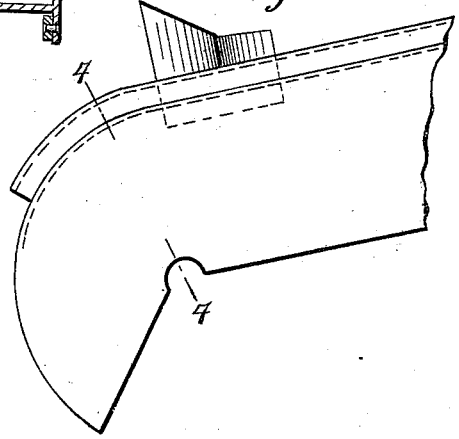
Witnesses:
Inventor:
Ysidoro Ferrer

UNITED STATES PATENT OFFICE.

YSIDORO FERRER, OF NEW YORK, N. Y.

COALING APPARATUS.

990,969.          Specification of Letters Patent.     Patented May 2, 1911.

Application filed August 11, 1909. Serial No. 512,448.

*To all whom it may concern:*

Be it known that I, YSIDORO FERRER, a citizen of the Republic of Cuba, and resident of 204 East Eighty-first street, city and county of New York, State of New York, United States of America, have invented a new and useful Coaling Apparatus, of which the following is a specification.

The object and purpose of my invention is to facilitate the coaling of vessels on the seas and docks from ship to ship or from the piers or docks to the vessels and vice versa.

This description is accompanied by drawings to demonstrate its practical use without stating the material of which this apparatus shall be made.

In the drawing, Figure 1 is a plan view of a coaling device embodying my improvements. Fig. 2 is a side elevation of the same. Fig. 3 is a section taken on line 3—3 of Fig. 2. Fig. 4 is a detail section of hood or housing taken on line 4—4 of Fig. 7. Fig. 5 is a detail of drum and conveyers. Fig. 6 is a detail section of conveyers taken on line 6—6 of Fig. 5. Fig. 7 is a detail of hood or housing.

Mounted upon a suitable platform A is a stout frame B shaped to support a hopper C. Standards D and D' are also bolted to said platform, their upper ends being provided with bearings $d$ and $d'$ for the journals $e$ and $e'$ of drums E and E', having octagonal surfaces to accommodate the links of a chain conveyer F. The hopper is provided with an inclined bottom, and the wall of said hopper is provided at the lowermost point of the bottom with a discharge opening $c$, which may be closed to a greater or less extent by a gate G pivoted at one end to the side of the hopper, and working in guides $g$, $g$. A hood or housing 4'' is carried by the standards D D', to entirely cover the upper lap of the chain conveyer, and partially cover the ends thereof. The gate G opens upon an inclined chute A' the lower end of which passes centrally through the wall of the housing 4'', near its lower end so that coal coming from the hopper will be deposited by gravity upon the chain conveyer near its lower end.

The side walls $f$ of the conveyer extend somewhat above the end walls $f'$ thereof, and are guided by the channels $h$ of the housing H. This insures evenness of travel on the supporting drums, and will prevent escape of coal over the side of the conveyer. These conveyer boxes are connected together at bottom by links $f^2$ which will permit the free travel of the conveyer over the drums, and tend to prevent sagging of the upper lap of the conveyer in operation. The upper end of the housing communicates through a discharge chute I with a flexible duct $i$ that may be moved to discharge coal at different points within reasonable limits.

The device is driven by power from any suitable source, through belt K and pulley L fixed to the shaft of drum E'.

It will be seen that the coal fed from the hopper to the conveyer belt can be regulated by the gate G to suit the rate of travel of the conveyer belt as it may be opened wide, or partially opened, or closed to cut off the feed. It will be understood that the platform A may be the deck of a vessel, or floor of a wharf and other minor changes may be made.

I claim:—

In an apparatus of the character described the combination of a conveyer, conveyer boxes for the conveyer, end walls for said boxes, side walls for the boxes of greater height than the end walls, a housing over the upper lap of the conveyer and channels in said housing for the upper ends of said side walls.

Washington Aug. 10 1909.

YSIDORO FERRER.

Witnesses:
ALEX. SCOTT,
B. H. MUNROE.

Copies of this patent may be obtained for five cents each, by addressing the "Commissioner of Patents, Washington, D. C."